United States Patent [19]
Vajna

[11] 4,108,766
[45] * Aug. 22, 1978

[54] ION EXCHANGE PROCESS WITH COUNTER-CURRENT FRACTIONAL REGENERATION

[75] Inventor: Sandor Vajna, Reichenbergerstrasse 30 a, 534 Bad Honnef, Germany Germany

[73] Assignee: Sandor Vajna, Bad-Honnef, Germany

[*] Notice: The portion of the term of this patent subsequent to Aug. 22, 1995, has been disclaimed.

[21] Appl. No.: 818,035

[22] Filed: Jul. 22, 1977

Related U.S. Application Data

[63] Continuation of Ser. No. 703,033, Jul. 6, 1976, abandoned, which is a continuation of Ser. No. 636,482, Dec. 1, 1975, abandoned, which is a continuation of Ser. No. 571,876, Apr. 25, 1975, abandoned, which is a continuation of Ser. No. 165,586, Jul. 23, 1971, abandoned, which is a continuation-in-part of Ser. No. 754,531, Aug. 19, 1968, abandoned, which is a continuation-in-part of Ser. No. 431,479, Feb. 9, 1965, Pat. No. 3,448,043.

[30] Foreign Application Priority Data

Aug. 19, 1967 [DE] Fed. Rep. of Germany ........... 53897

[51] Int. Cl.$^2$ ..................... B01D 15/06; C02B 1/76
[52] U.S. Cl. ........................ 210/32; 210/34; 210/37 R
[58] Field of Search ........................ 210/32

[56] References Cited

U.S. PATENT DOCUMENTS 3,448,043  6/1969  Vajna ................................. 210/32

Primary Examiner—Charles N. Hart
Assistant Examiner—Robert H. Spitzer
Attorney, Agent, or Firm—Burgess, Dinklage & Sprung

[57] ABSTRACT

In an ion exchange process wherein an ion exchange bed is successively charged and discharged during an exchange cycle with an ion, here designated as "X" ion, with "Y" being used to designate the replacing ion and "Z" the oppositely charged ion associated with X and Y, by passing aqueous solutions of the ions through the bed, with the flow thereof during charging being in one direction and during discharging in the opposite direction; the improvement with respect to the discharge portion of the cycle starting with the bed charged with X ions and filled with water substantially free of X, Y and Z ions, comprising passing at least four groups of fractions through said bed, as follows:

1) a first feed group of fractions, containing X, Y and Z ions, the concentration of Z ions remaining substantially constant, the concentration of X ions successively decreasing downwardly to or near to zero and the concentration of Y ions correspondingly increasing.
2) a second feed group of fractions containing Y and Z ions at the concentration of Z ion substantially equal to the concentration of said ions in the previous group and free of X ions, being introduced as feed to the process.
3) a third feed group of fractions containing Y and Z ions, the concentration of which successively decrease to or near to zero, and
4) a fourth feed group of fractions consisting essentially of pure water free of X, Y and Z ions;

And recovering from the bed at least 3 effluent groups of fractions, as follows:

a) a first effluent group of fractions which may contain the displaced water content of the bed and contains a solution containing predominantly X ions and minor amounts of Y ions, both associated with Z ions, which group is at least in part removed from the process as product,
b) a second effluent group of fractions, identical to the first feed group, and
c) a third effluent group of fractions, identical to the third feed group, and collecting the second and third effluent groups and using the same in a subsequent discharge portion of a cycle.

The charging portion of the cycle may be improved in the same way.

10 Claims, No Drawings

ION EXCHANGE PROCESS WITH COUNTER-CURRENT FRACTIONAL REGENERATION

Related Application

This application is a continuation of Ser. No. 703,033, filed July 6, 1976, which is a continuation of Ser. No. 636,482, filed Dec. 1, 1975, which is a continuation of Ser. No. 571,876, filed Apr. 25, 1975, which is a continuation of Ser. No. 165,586, filed July 23, 1971, which is a continuation-in-part of "Method for Carrying Out Ion Exchange Reactions", Ser. No. 754,531, filed Aug. 19, 1968, which are all abandoned, which in turn was a continuation-in-part of "Ion Exchange Process," Ser. No. 431,479, filed Feb. 9, 1965, now U.S. Pat. No. 3,448,043, issued June 3, 1969.

PREAMBLE

An ion exchange cycle consists of at least two, and in some cases more, exchange reactions. If, for example, an ion exchange cycle consists of only two exchange reactions, the exchanger bed is charged at the beginning of a reaction with the type of ion that is to be replaced. The exchanger bed often unavoidably contains small amounts of the type of ion that is to serve as the replacing ion. In the first stage of the process, a solution of replacing ions is charged into this exchanger bed. The product recovered from the reaction is composed of a mixture of replacing ions and ions to be replaced.

A second exchange reaction is then carried out in the exchanger bed in which the roles of the two types of ions are reversed, i.e., those which were formerly the ions to be replaced are now charged in solution form into the exchanger bed, so as to displace what were formerly the replacing ions. As a result, again, a mixture of ions to be replaced and replacing ions is obtained as the product of the reaction. This second reaction completes the ion exchange cycle.

The two exchange reactions are separated by introducing water into the exchanger bed which displaces the solutions from the exchanger bed. The result is that, at the beginning of each exchange reaction of a cycle, the exchanger bed is usually filled with water which is displaced from the exchanger bed by the reaction solution. In one exchange cycle, therefore, the following steps must be carried out for each of the two reactions of the cycle: displacement of the water in the exchanger bed by the reaction solution, replacement of the ions to be replaced by the replacing ions of the reaction solution, and displacement of the reaction solution from the exchanger bed by water.

In order to be able to carry out the ion exchange process with satisfactory results, it is necessary to ensure that the solution that forms as the product of the exchange reaction contains the ions to be replaced in the greatest possible amounts. The exchange reaction product is considered to be pure only if it contains nothing but the ions to be replaced. This, however, is achieved in the known so-called classic or parallel downflow ion exchange process only when just a small part of the capacity of the exchanger bed is charged with the replacing ions. The exchanger bed used for the second exchange reaction thus contains only a minor amount of ions which can be replaced, so that the product of this exchange reaction has a very unfavorable composition, since even the first effluent fractions of the solution to be taken as the product contain both types of ions. If it is desired to heavily charge the exchanger bed in one reaction with replacing ions, so as to obtain the product of the other reaction in as pure a state as possible, i.e., substantially only ions to be replaced are present, it is necessary in the first reaction to introduce a large excess of the replacing ions to the exchanger bed. The product of the first exchange reaction will then contain large amounts of the replacing ions. Therefore, in the simple prior art ion exchange process a product which is composed substantially only of ions to be replaced, and hence is pure, can be obtained only if a very impure product is permitted in the other reaction.

Elimination of the aforesaid disadvantages associated with the simple ion exchange process was in part effected by counterflow operation. Whereas in the classic ion exchange process, each solution in each exchange reaction is fed in at the same end (e.g. top) of the exchanger bed, and is discharged at the opposite end (e.g. bottom) of the exchanger bed, but always at the same position, in the liquid counterflow process the reaction solutions in the different exchange reactions are introduced at different ends of the exchanger bed. The solution containing the replacing ions is fed in at that end of the exchanger bed which is rich in these replacing ions, and at the same time, at the other end, the ions to be replaced are removed from the exchanger bed at those points at which the said ions to be replaced are present in large quantities at the beginning of the reaction.

The simplest type of liquid counterflow process consists in the reversal of the direction of flow of the liquids in the exchanger bed as the two reactions take place. That is, the liquid flow in the one reaction takes place from top to bottom, and in the other reaction it is carried out with the liquid flowing from the bottom to the top. The replacing ions in the solution that is charged into the bed are supposed to completely replace the ions to be replaced in the entering layers of the exchanger bed, while the replacing ions of the solution are to be completely replaced by the ions to be replaced in the layers found at the exit of the exchanger bed.

The realization of this fundamentally simple principle has given rise to considerable difficulty in practice. On the one hand, the upward flow loosens the exchanger bed, thereby diminishing the rate of exchange, and on the other hand, the maintenance of the stratification of the exchanger packing is possible only if the packing loosened by the upward flow does not divide into pieces and become mixed. To prevent this disturbance of the exchanger packing it has been proposed to maintain a weak downward flow of water in the bed from the top to the exit point of the reaction solution, while the reaction solution is being pumped from the bottom upwardly to the exit point. Alternatively, it has been proposed to inflate an elastic balloon over the exchanger bed and to employ the same to hold the packing down. Still further, various apparatus have been proposed for installation in the exchanger bed in certain manners designed to preserve the stratification of the exchanger packing during the exchange reaction.

An ion exchange process has been proposed in which an incomplete counterflow of liquids is used. In this process, two equal exchanger beds are used, the sequence of their use in the one reaction being the reverse of what it is in the other, so as to assure an incomplte liquid counterflow. The two exchanger beds are used simultaneously for each reaction until this reaction is terminated simultaneously in both beds. The ions to be replaced in the first bed are largely replaced by the replacing ions of the solution, while the replacing ions remaining in the solution can be largely replaced by the ions to be replaced in the second bed. This process is repeated in reverse sequence in the other reaction, so that products can be obtained in both reactions which consist mainly of only one type of ions. Carrying out this process offers no technical difficulties, and can be performed with comparatively simple apparatus.

Both forms of the liquid counterflow process, however, have an important disadvantage. This can be appreciated from the fact that these processes are appropriate only when the capacity of the exchanger bed is used only to a limited extent, because only in this case will the resin at the exit end contain substantial amounts of the ions to be replaced. As a result the usable capacity is very low in both types of the liquid counterflow process. It is usually necessary to increase the volume of the exchanger bed as compared to the volume used in the classic process. Furthermore, the relative amount of wash water required for a particular exchange output is considerably greater. As a consequence, the amount of water diluting the product of the ion exchange increases quite considerably which is disadvantageous if it is desired to further process the ion exchange product for further uses. Consequently, it has been necessary in practice to abandon substantially pure reaction products, even though they are theoretically possible, and instead to be satisfied with products which contain only 70 to 80 percent of the ions to be replaced. In other words, with reference to the amount of the ions to be replaced, it has been necessary to use 130 to 140 percent of replacing ions measured in chemical equivalents. In terms of water processing technology, this consumption is referred to as 130 to 140 percent of theory.

THIS INVENTION

This invention is a process for carrying out ion exchange reactions whereby it is possible in the discharging reaction to extensively replace the replacing ions by the ions to be replaced and vice versa in the charging reaction so that the working capacity of the exchanger beds is not less than their capacities as conventionally realized in the classic process.

In the present ion exchange process, an ion exchange bed is successively charged and discharged during an exchange cycle with an ion, here designated as "X" ion, with "Y" being used to designate the replacing ion and "Z" the oppositely charged ion associated with X and Y, by passing aqueous solutions of the ions therethrough, with the flow thereof during charging being in one direction and during discharging in the opposite direction.

The improvement of this invention with respect to the discharging portion of the cycle starting with the bed charged with X ions and filled with water substantially free of X, Y, and Z ions, comprises passing at least four groups of fractions through said bed, as follows:

(1) a first feed group of fractions, containing X, Y and Z ions, the concentration of Z ions remaining substantially constant, the concentration of X ions, successively decreasing downwardly to or near to zero and the concentration of Y ions correspondingly increasing, (2) a second feed group of fractions containing Y and Z ions at the concentration of each Z ions and Y ions substantially equal to the concentration of Z ions in the previous group and free of X ions, being introduced as feed to the process, (3) a third feed group of fractions containing Y and Z ions, the concentrations of which successively decrease to or to near zero, and (4) a fourth feed group of fractions consisting essentially of pure water free of X, Y and Z ions;

and recovering from said bed at least 3 effluent groups of fractions, as follows:

(a) a first effluent group of fractions which may contain the displaced water of the bed and contains a solution containing predominantly X ions and minor amounts of Y ions, both associated with Z ions, which group is removed from the process, (b) a second effluent group of fractions, identical to the first feed group, and (c) a third effluent group of fractions, identical to the third feed group.

The second and third effluent groups are collected and used in a subsequent discharging portion of a cycle of the process.

The present process can be applied to the multi-bed liquid counterflow process in which the liquid counterflow process is carried out with two or more exchanger beds whose sequence is reversed in the different exchange reactions, and through all of which the fractions flow downwardly.

In the production of certain products, it may be important to maintain the concentration of the reaction products as high as possible. This would make it undesirable for the water content of the exchanger beds to be added to the solution recovered as the product. In these cases it is advantageous to carry out the process of the invention in such a manner that, prior to charging the first group, to first charge an additional group of fractions (1a), which additional fractions contain predeminately the ions X and minor amounts of Y, both associated with Z ions, the ion Z being in a concentration which increases but does not equal the Z ion concentration of the first group. In this embodiment, the following fractions are first discharged from the beds:

(ai) a predetermined amount of solution which by and large contains the original water content of the bed with minor amounts of X, Y and Z ions, which is discarded as waste, (aii) an additional effluent group of fractions identical to the additional feed group of fractions, and which is used as such in a succeeding cycle, and (aiii) a predetermined amount of solution which contains predominately X and minor amounts of Y-ions, both associated with Z ions, the Z ions in a concentration about equal to the overall concentration thereof in the originally described first effluent group, which is removed from the process as product.

An exchanger bed into which the solution of the replacing ions (Y) has been introduced only to the break-through point or slightly beyond still has a portion of its capacity, in the vicinity of the exit point of the solution, charged with the ions X to be replaced. This portion is referred to as the residual capacity. After the completion of one exchange reaction, the order of the exchanger beds is reversed, so that the residual capacity is now located in the middle — at the exit end of the bed which now constitutes the first bed. The reaction solution consisting of XZ is now charged first to this bed, and first takes up the ions Y to be replaced from the layers at the point of entry, but then exchanges them for the replacing ions X of the residual capacity. As a result a solution is charged to the second exchanger bed, which contains considerable amounts of the replacing X ions. These replacing ions in turn react with the Y ions to be replaced which are present in that bed. The replacing X ions held by the residual capacity at the beginning of the charging reaction are thus displaced by the inflowing solution toward the outlet point. They leave the second exchanger bed sooner than do the same ions of the input solution and thus they signify a loss of replacing ions.

It has now been found that the capacity-reducing effect of the replacing ions from the residual capacity can be diminished advantageously by fractions whose main purpose is to displace water from the exchanger beds. Although these displacement fractions are more dilute than the fractions of the reaction solution, they still contain enough exchangeable ions to absorb the replacing ions of the residual capacity.

At the beginning of the charging reaction, the residual capacity is in the middle of the system, i.e. at the outlet point of the exchanger bed that is now connected as the first bed. The Y ions to be replaced of the displacement fractions (1a) that have reached this point take the place of the replacing ions X of the residual capacity. It is advantageous not to introduce these fractions to the second exchanger bed, but to store them after they leave the first bed (charging reaction). In the next cycle these displacement fractions (1a) are returned to the first bed. They contain both types of ions. The top layer of the exchanger bed contains, during the displacement, the ions Y to be replaced solely, or largely, and these ions are then replaced by the replacing ions X from the fractions. So the fractions that reach the lower strata contain nothing but the Y ions to be replaced, i.e. they absorb the X-ions from the exit layers and at their emergence they are of the same composition as in the preceding cycle.

The process described is then repeated in each cycle. The replacing ions of the residual capacity in the exit layers of the first bed are replaced by the ions to be replaced and thus arrive at the next cycle during the displacement in the entry layers. Consequently they are the greatest possible distance from the exit layer. This makes it possible to make use of a larger part of the capacity prior to the break-through of the replacing ions. Therefore the displacement fractions in this part of the process have to be divided into two parts, the first being fed through the one exchanger bed only, and the second being fed through the second exchanger bed only.

Accordingly, the present process can be conducted in such a manner that fraction 1a of the first feed group is subdivided into as many sub-fractions, 1aa, 1ab, etc., as there are exchanger beds in the series, sub-group 1aa being fed only to the first exchanger bed, sub-group 1ab only to the second bed, etc. The water content of the individual exchanger beds, ai-a, ai-b, etc., (the first of the effluent fractions) and the succeeding groups aii-a, aii-b, etc., and aiii-a, aiii-b, etc. from each exchanger bed are collected separately. First the fractions of group 1 are fed through the entire series and groups aii-a, aii-b, etc., are used in the next cycle as fraction groups 1aa, 1ab, etc. The fractions by which the reaction solution is displaced from the exchanger beds would also transfer from the exit bed to the entry bed the replacing ions occupying the residual capacity. Since the order of the beds is reversed during regeneration reaction (second reaction), these ions would be located closer to the point of emergence from the bed and would break through prematurely and contaminate the product. For this reason it is advantageous for feed group 3 to be divided into as many subgroups 3a, 3b, etc., as there are exchanger beds in the series, 3a being delivered only to the first exchanger bed, 3b only to the second, etc., and for effluent group c to be divided into as many sub-groups c-a, c-b etc., as there are exchanger beds, c-a being taken separately from the first exchanger bed, c-b from the second, etc., and for c-a, c-b, etc., to be used in the next cycle as sub-groups 3a, 3b, etc.

Further advantages are obtained if the fractions which are introduced into the individual exchanger bed, are completely separated from each other. Each group is separately introduced into the bed A as well as into the bed B and is also removed separately. The pure solution of the exchange ions, feed fraction 2, is only introduced into bed A. There is then obtained from bed A as product of the partial exchange, a solution aiii/A. This solution is then introduced into bed B in place of the pure solution of the exchange ions as feed solution 2/B. Solution aiii/B is then the product of the exchange reaction. The groups ai/A and ai/B are removed as waste, the groups aii/A resp. aii/B are in the next cycle used as groups 1a/A resp. 1a/B, the groups b/A resp. b/B as 1/A resp. 1/B and the groups c/A resp. c/B as 3/A resp. 3/B.

The complete separation of all of the fractions has the advantage that contamination, i.e., transfer of any impurity from one bed through solutions obtained from the other exchanger bed, is avoided. In this way there are obtained products which have even a higher degree of purity than those so far obtained.

Usually it is sufficient to operate with two exchanger beds. In some cases, however, it may be desired to conduct the reaction with such a small quantity of the replacing ions that the ions to be replaced of the first bed are not fully replaced. In other words, in this case an unused residual capacity is left. Often it is sufficient to divide up the displacement fractions in the manner that has been described. In other cases, it is advantageous instead of two equally large exchanger beds to use three or more equally large beds. The exahnger bed which is connected as the first bed, is treated with a larger quantity of the replacing ions in relation to its capacity than in the case of two exchanger beds. This increase can amount, for example, to 33 percent if three beds are used.

In the desalting of aqueous solutions, several pairs of cation and anion exchanger beds are often connected in series to still further reduce the salt content. It has been found that the process of this invention can be used for the regeneration of these exchangers to special advantage, if the exchanger beds of the same kind are combined into groups after their exhaustion, and are regenerated within these groups in the reverse of the sequence in which they are used during the desalting. The process can be used independently of the nature of the exchanger used as the first bed.

It is to be understood that what is said herein with respect to the discharging or charging portion of the cycle applies, respectively, to the charging and discharging portion.

The process of this invention can be carried out in a single bed with liquid counterflow, the fractions being conducted downwardly in the one exchange reaction and upwardly in the other exchange reaction. If, however, a large, long, vertical exchanger bed is used to increase the capacity, the resistance at a high throughput may be too great, so that the liquid can no longer be satisfactorily forced through the bed. In these circumstances, it is desirable to divide the bed into smaller units. In this case, too, the process of the invention is carried out in such a manner that, in the one exchange reaction, the fractions are pumped upwardly through each bed, and in the other exchange reaction they are pumped downwardly through each bed.

If it is desired to obtain the products of both exchange reactions as free as possible of the replacing ions, this can be achieved advantageously by reducing the quantity of the input ions. This reduction of the ions differs from case to case, and depends on the nature of the ion exchanger, on the exchange reaction performed, and on the throughput of the solutions. It is governed always by the reaction whose selectivity coefficient is smaller than 1, because in this reaction the replacing ions break through faster than in the counter-reaction. For example, it has been possible for the first time to regenerate a strong acid cation exchanger charged with calcium and sodium ions in a water desalting process, using 103 to 105 percent of the absorbed cations in hydrochloric acid, measured in chemical equivalents, and at the same time making a capacity usable which corresponded to more than 60 percent of the total capacity of the exchanger beds, and which, in other words, represented a usable capacity of ordinary magnitude of the classic process.

The process of the invention can be used both for cation and for anion exchange. The number and volume of the fractions required are best determined beforehand in the laboratory by experiment. The results of the laboratory experiments are then applied on an industrial scale on the basis of the volume of the exchanger beds, i.e., the fractions must have the same relative volume as the bed volume.

Often an exchange cycle consists of a plurality of exchange reactions. For example, with a juice obtained from sugar beets and clarified with lime and carbon dioxide, the so-called thin juice, the cations and the amino acids are both taken up by a cation exchanger. In order to obtain the amino acids separately, the cation exchanger is treated with an ammonia solution, whereupon the ammonium ions replace the amino acids. Then the exchanger bed is regenerated with acid. In this case, the process of the invention assures better utilization of the ammonia solution and production of a solution of amino acids with near the concentration of the ammonia solution.

The process of the invention is further illustrated by the following Examples. It should be understood that, although these Examples may describe in particular detail some of the more specific features of this invention, they are given primarily for the purpose of illustration and the invention in its broader aspects is not be be construed as limited thereto.

EXAMPLES

EXAMPLE 1

The first reaction (discharging reaction) was:

$$(CaCl_2 + NaCl) + R_1H = HCl + R_1 (Ca+Na)$$

$R_1$ designates the exchange resin. The second reaction (charging reaction) was:

$$HCl + R_1 (Ca + Na) = CaCl_2 + NaCl + HCl + R_1H$$

The replacing or "Y" ions are the $H^-$ the ions to be replaced, or the "X" ions, are the $Ca^+$ and the $Na^+$ ions, and $Cl^-$ is the "Z" ion.

Two exchanger beds were used, each of which contained 150 ml of a strongly acid cation exchanger (Dow Chemical Company's Dowex 50W × 8, 20–50 mesh). A solution was introduced into these beds which contained 50 meq of $CaCl_2$ and 10 meq of NaCl per liter. When a cation concentration of 6 meq had been reached in the outflowing solution, the introduction of the solution was discontinued. At that time 7.3 liters of solution had passed through the exchanger beds, and the pair of beds had in this time period absorbed 438 meq of cations. The average cation content of the total discharged solution amounted to 0.25 meq/l.

The order of the exchanger beds was then reversed and the beds regenerated. For this purpose the following feed fractions were used:

| Group | Fraction | Composition of feed fractions, eq/l | | | |
|---|---|---|---|---|---|
| | | HCl | CaCl$_2$ | NaCl | ml |
| No. 1 | 1 | 1.70 | 2.10 | 0.10 | 100 |
| | 2 | 2.32 | 1.73 | 0.10 | 100 |
| | 3 | 2.72 | 1.50 | 0.09 | 100 |
| | 4 | 2.80 | 1.28 | 0.07 | 100 |
| | 5 | 2.92 | 1.18 | 0.05 | 100 |
| | 6 | 3.10 | 1.05 | 0.01 | 100 |
| | 7 | 3.17 | 0.90 | 0.01 | 100 |
| | 8 | 3.42 | 0.67 | 0.01 | 100 |
| | 9 | 3.55 | 0.45 | 0.00 | 100 |
| No. 2 | 10 (input) | 4.00 | — | — | 150 |
| No. 3 | 11 | 0.92 | 0.0 | — | 60 |
| | 12 | 0.04 | 0.0 | — | 60 |
| No. 4 | 13 (water) | — | — | — | 180 |

The first effluent group withdrawn (a) consisted of 320 ml and was withdrawn from the process. The second effluent group (b) was then withdrawn, and was identical to the first feed group. Then the third effluent group (c) was collected, and was identical to the third feed group.

In the classic prior art process with an ion exchanger bed with a volume of 300 ml, it would have been necessary to charge into the bed 890 meq of 4N hydrochloric acid to assure the above-stated exchange capacity of 438 meq, which was accomplished by the method of the invention with 600 meq of 4N hydrochloric acid. However, an average cation content in the treated solution of 0.6 meq/l would have been obtained instead of the 0.25 meq/l realized in accordance with this invention. To arrive at the low cation content that was obtained according to this invention, it would have been necessary to charge into the bed in the prior art process 1200 meq of 4N hydrochloric acid. The working capacity would have been increased somewhat, but the acid would have been used with much less efficiency.

If, however, a multi-fraction process according to the process of this invention is followed, but using a single exchanger bed containing 300 ml of exchanger only, 900 meq of 4N hydrochloric acid would have been required in order to assure the low overall cation content of the solution treated.

EXAMPLE 2.

The first reaction (discharging reaction) was:

$$NaCl + R_2OH = NaOH + R_2Cl$$

The second reaction (charging reaction) was:

NaOH + R₂Cl = (NaCl + NaOH) + R₂OH

The replacing or "Y" ions are the OH⁻ ions, the ions to be replaced, or the "X" ions are the Cl⁻ ions, and Na⁺ is the "Z" ion. The exchange resin was Dowex 2 × 8, 20–50 mesh, a strongly basic Type II exchange resin.

There was pumped into a freshly regenerated pair of exchanger beds containing 85 ml of resin in bed A and 137 ml in bed B, 2 liters of a solution originally containing 50 meq/l of NaCl, which had previously been passed through a similar pair of beds. Thereafter 3.25 liters of fresh solution was pumped into the beds. 3.25 liters were withdrawn from the process from the discharge of the pair of beds, and the following 2 liters fed into another freshly regenerated pair of beds. The said withdrawn solution contained 4.5 mval of NaCl and 45.5 meq of NaOH. The pair of beds had thus absorbed 148 meq of chloride ions.

Regeneration was carried out by reversing the order of the beds and treating them with fractions identified in the table, at a flow rate of 16 ml/m.

Bed B

| Influent | | | | Effluent | | |
|---|---|---|---|---|---|---|
| Group | Sub-group | Fract. No. | ml | Group | Sub-group | Fract. No. | ml |
| | 1a/B | 1/B | 50 | | ai/B | | 45 (waste) |
| 1/B | | 2/B | 100 | a/B | aii/B | 1/B | 50 |
| | | 3/B | 100 | | aiii/B | | |
| | | 4/B | 200 | | + | | |
| | | 5/B | 200 | | | | |
| 2/B | | 6/B | 110 (input) | b/B | b/B | T/B | 714 |
| 3/B | | 7/B | 50 | | | | |
| 4/B | | 8/B | ~ (water) | c/B | | 9/B | 50 |

Bed A

| Influent | | | | Effluent | | |
|---|---|---|---|---|---|---|
| Group | Sub-group | Fract. No. | ml | Group | Sub-group | Fract. No | ml |
| | | 1/A | 50 | | ai/A | | 75 (waste) |
| | 1a/A | | | | aii/A | 1/A | 50 |
| | | 2/A | 50 | a/A | aii/A | 2/A | 50 |
| 1/A | | | | | aiii/A | 3/A | 120 (product) |
| | | T/B | 714 | | | 4/A | 100 |
| 2/A | | | | | | 5/A | 100 |
| | | 3/A | 50 | b/A | | 6/A | 200 |
| 3/A | | 4/A | 50 | | | 7/A | 200 |
| 4/A | | 5/A | ~ (water) | c | | 8/A | 50 |
| | | | | | | 9/A | 50 |

From the effluent of B 1/B and 8/B are in the next cycle used as 1/B and 8/B. T/B is transferred to the bed A continuously, without dividing it in fractions. From the effluent of A 1/A and 2/A are used in the next cycle as 1/A and 2/A. 3/A is withdrawn as product of the reaction, 4/A, 5/A, 6/A and 7/A are used in the next cycle as 2/B, 3/B, 4/B and 5/B. 8/A and 9/A are used in the next cycle as 3/A and 4/A.

The cycles were repeated 15 times, till the composition of the product (3/A) showed no more change. From this moment it contained 148 meq Cl-ions. Introducing with the input 110 ml 1,47 N NaOH, i.e. 163 meq, the caustic consumption corresponds to 109%. The utilizable capacity was 0.67 eq/l. The composition of the recycled fractions was not determined.

EXAMPLE 3

The exchanger, the exchange reaction, the replacing ions and the ions to be replaced are the same as in Example 1.

Two exchanger beds each containing 300 ml of strongly acid cation exchanger were used. The solution charged into the beds contained 10 meq/l of $CaCl_2$ and 2 meq/l of NaCl. Expressed as CaO, the cation content amounted to 34°, (1° = 10 mg/l CaO). It was possible to charge 67 liters of solution before realizing the breakthrough value of 10 relative percent, 783 meq of cations being absorbed thereby. The cation slippage averaged 0.05 meq/l, equal to 1.4 ppm CaO.

The following fractions were used at a flow rate of 15 ml/min. for the regeneration, the order of the exchanger beds having been reversed:

| Group | Fraction No. | (Vol. /ml) | Composition of Feed Fractions Concentration in eq/l | | |
|---|---|---|---|---|---|
| | | | HCl | $CaCl_2$ | NaCl |
| No.1 | 1 | (200) | 0.50 | 3.00 | 0.40 |
| | 2 | (200) | 0.92 | 2.80 | 0.33 |
| | 3 | (200) | 1.28 | 2.50 | 0.30 |
| | 4 | (200) | 1.75 | 2.22 | 0.13 |
| | 5 | (200) | 2.00 | 1.88 | 0.07 |
| | 6 | (200) | 2.15 | 1.65 | 0.05 |
| | 7 | (200) | 2.38 | 1.48 | 0.03 |
| | 8 | (200) | 2.70 | 1.08 | 0.02 |
| No.2 | 9 | (HCl-200) | 4.00 | — | — |
| No.3 | 10 | (100) | 0.85 | — | — |
| | 11 | (100) | 0.03 | — | — |
| No.4 | 12 | (water-370) | — | — | — |

No more than 102.5% HCl had to be used. 585 ml was first separated from the effluent solution as the regeneration product. The fractions for use as feed in the next cycle were then collected.

EXAMPLE 4

The exchanger, the exchange reaction, the replacing ions and the ions to be replaced are the same as in Example 1; only the composition of the anions (Z) was different; 70% of them were strong acid anions, Cl⁻ and $SO_4^-$ ions, 30% were $HCO_3^-$ ions. The bed volume was 1000 ml. The fractions were used in the same groups as described in Example 3. The volume of the product of the regeneration was 1050 ml, and the flow rate during the regeneration 25 ml/min.

The water to be desalted was pumped upwardly from the bottom, and the regenerating fractions were pumped downwardly from the top. During the delivery of water to the bed, water which had already passed through the exchanger bed and whose composition was the same as that of the main stream of the desalted water, was caused to flow downwardly from the top through the bed. Underneath the topmost bed layer a pipe system was established having channels therein, through which both streams were conducted off. The water was conducted through the bed until the cation content had risen to 5 percent of the initial value. Then the bed was backwashed and regenerated.

The water treated contained 20 German hardness degrees (1° = 10 mg/1 CaO) as cations at an alkalinity of 30 percent and a sodium content of 20 percent. It was possible to pass 190 liters of water through until the desired point was reached. 1350 meq of cations were absorbed, i.e. the 1380 meq of HCl were 98 percent utilized.

The following fractions were introduced into the one-liter exchanger bed:

| Group | Fraction No. | (Vol./ml) | Composition of Feed Fractions Concentraton in eq/l | | |
|---|---|---|---|---|---|
| | | | HCl | CaCl$_2$ | NaCl |
| No. 1 | 1 | (350) | 0.40 | 3.05 | 0.45 |
| | 2 | (350) | 0.88 | 2.82 | 0.35 |
| | 3 | (350) | 1.28 | 2.50 | 0.30 |
| | 4 | (350) | 1.75 | 2.22 | 0.13 |
| | 5 | (350) | 2.02 | 1.88 | 0.05 |
| | 6 | (350) | 2.17 | 1.66 | 0.04 |
| | 7 | (350) | 2.35 | 1.50 | 0.03 |
| | 8 | (350) | 2.70 | 1.09 | 0.01 |
| No. 2 | 9 | (HCl-345) | 4.00 | — | — |
| No. 3 | 10 | (150) | 0.95 | — | — |
| | 11 | (150) | 0.05 | — | — |
| No. 4 | 12 | (water) | — | — | — |

I claim:

1. In an ion exchange process wherein an ion exchange bed is successively charged and discharged during an exchange cycle with an ion, here designated as "X" ion, with "Y" being used to designate the replacing ion and "Z" the oppositely charged ion associated with X and Y, by passing aqueous solutions of said ions therethrough, with the flow thereof during charging being in one direction and during discharging in the opposite direction; the improvement in the charging or discharging of the bed which comprises, in terms of discharging of the bed starting with said bed charged with X ions and filled with water substantially free of X, Y, and Z ions, comprising passing at least four groups of fractions through said bed, as follows:
   (1) a first feed group of fractions, containing X, Y and Z ions, the concentration of Z ions remaining substantially constant, the concentration of X ions successively decreasing downwardly to or near to zero and the concentration of Y ions correspondingly increasing
   (2) a second feed group of fractions containing Y and Z ions at the concentration of each Y and Z ions substantially equal to the concentration of Z ions in the previous group and free of X ions, being introduced as feed to the process
   (3) a third feed group of fractions containing Y and Z ions, the concentrations of which successively decrease to or near to zero, and
   (4) a fourth feed group of fractions consisting essentially of pure water free of X, Y, and Z ions;
recovering from said bed at least 3 effluent groups of fractions, as follows:
   (a) a first effluent group of fractions containing the displaced water of the bed and a solution containing predominantly X ions and minor amounts of Y ions, both associated with Z ions, which group is removed from the process,
   (b) a second effluent group of fractions, identical to said first feed group, and
   (c) a third effluent group of fractions, identical to said third feed group;
and collecting said second and third effluent groups and using the same in a subsequent discharge portion of a cycle of said process.

2. The process of claim 1, wherein two of said beds vertically disposed are used in series and wherein the order of said beds is reversed during the charging and discharging portions of the cycle.

3. The process of claim 2, wherein said feed groups other than No. 2 are subdivided into as many subgroups as there are exchanger beds, with the first subgroups introduced to the first bed, the second subgroups in the second bed, this procedure being followed for all said beds and wherein the effluents too are subdivided into as many subgroups as there are exchanger beds, collected and used partly as feed groups in the subsequent cycle and partly withdrawn as solutions from each bed, feed fraction No. 2 is introduced in the first bed of the series, the resulting solution obtained from this bed is used as feed for the second bed and this procedure followed for all said beds, effluent from the last bed corresponding to feed fraction No. 2 is removed from the process as the product.

4. The process of claim 1, wherein prior to the introduction of said first feed group, an additional feed group of fractions containing predominately X and Z ions is passed through said bed, the X and Z ion concentration of which increases but does not equal that of the Z ions of said first feed group of fractions, and wherein said first effluent group of fractions is collected as follows:
   (ai) a predetermined amount of solution which by and large contains the original water content of the bed with minor amounts of X and Z ions, which is discarded as waste,
   (aii) an additional effluent group of fractions identical to said additional feed group of fractions, and which is used as such in a succeeding cycle, and
   (aiii) a predetermined amount of solution which contains predominantly X and Z, the Z ions in a concentration near to or equal to the concentration thereof in said first effluent group, which is removed from the process as said product.

5. The process of claim 4 wherein at least two of said exchanger beds are used in series and wherein said additional groups of fractions are sub-divided into as many sub-groups as there are exchanger beds, with each being introduced into one of said beds, with the water displaced thereby from each bed, being separately collected for use as said additional groups of fractions in a subsequent cycle.

6. The process of claim 4, wherein two of said beds vertically disposed are used in series and wherein the order of said beds is reversed during the charging and discharging portions of the cycle, wherein said feed groups other than No. 2 are subdivided into as many subgroups as there are exchanger beds, with the first subgroups introduced to the first bed, the second subgroups in the second bed, this procedure being followed for all said beds and wherein the effluents too are subdivided into as many subgroups as there are exchanger beds, collected and used partly as feed groups in the subsequent cycle and partly withdrawn as solutions from each bed, feed fraction No. 2 is introduced in the first bed of the series, the resulting solution obtained from this bed is used as feed for the second bed and this procedure followed for all said beds, effluent from the last bed corresponding to feed fraction No. 2 is removed from the process as the product.

7. The process of claim 1 wherein at least two of said exchanger beds are used in series and wherein said third feed group is sub-divided into as many sub-groups as there are exchanger beds, with the first sub-group being introduced into the first bed, the second sub-group being introduced into the second bed, this procedure being followed for all said beds in the series, and wherein said third effluent group is correspondingly sub-divided, collected, and used in a subsequent cycle as said third feed group.

8. The process of claim 7, wherein the order of said beds is reversed during charging and discharging portions of the cycle.

9. The improvement of claim 1 wherein said bed or beds are vertically disposed with the charging portion of the cycle being conducted with vertical flow therethrough in one direction, and the discharging portion with vertical flow in the other direction.

10. The improvement of claim 1 wherein the ion content of said second feed group is adjusted so that said first effluent group contains X ions and only traces of Y ions.

* * * * *

UNITED STATES PATENT AND TRADEMARK OFFICE
CERTIFICATE OF CORRECTION

PATENT NO. : 4,108,766
DATED : Aug. 22, 1978
INVENTOR(S) : Sandor Vajna

It is certified that error appears in the above-identified patent and that said Letters Patent are hereby corrected as shown below:

Title Page Notice, disclaimer date of "August 22, 1995" should read:
-- June 3, 1986 --.

Signed and Sealed this

Tenth Day of April 1979

[SEAL]

Attest:

RUTH C. MASON
Attesting Officer

DONALD W. BANNER
Commissioner of Patents and Trademarks